United States Patent [19]
Pietruszewski et al.

[11] 4,066,722
[45] Jan. 3, 1978

[54] APPARATUS FOR SPARGING GAS INTO LIQUID

[75] Inventors: John Joseph Pietruszewski, Buffalo; Carl Scaccia, Depew; Ralph James Wagner, Tonawanda, all of N.Y.

[73] Assignee: Union Carbide Corporation, New York, N.Y.

[21] Appl. No.: 688,739

[22] Filed: May 21, 1976

[51] Int. Cl.² .............................................. B01F 3/04
[52] U.S. Cl. .................................. 261/87; 210/219; 210/220; 261/93
[58] Field of Search ............... 261/87, 93, 36 R, 91, 261/122–124; 210/219, 220, 221 P, 221 M

[56] References Cited

U.S. PATENT DOCUMENTS

| | | | |
|---|---|---|---|
| 2,055,065 | 9/1936 | Booth | 261/93 |
| 2,183,071 | 12/1939 | Guthrie et al. | 261/93 |
| 2,433,592 | 12/1947 | Booth | 261/93 |
| 2,436,375 | 2/1948 | Booth et al. | 261/93 X |
| 2,590,581 | 3/1952 | Shirley | 261/93 |
| 2,673,724 | 3/1954 | Potts | 261/87 |
| 2,928,661 | 3/1960 | Maclaren | 261/87 X |
| 2,996,287 | 8/1961 | Audran | 261/87 X |
| 3,385,576 | 5/1968 | Wikswo | 261/93 |
| 3,536,305 | 10/1970 | Lefrancois | 261/93 |
| 3,547,813 | 12/1970 | Robinson et al. | 261/93 X |
| 3,643,403 | 2/1972 | Speece | 261/91 X |
| 3,650,513 | 3/1972 | Werner | 261/87 |
| 3,775,307 | 11/1973 | McWhirter et al. | 261/87 X |
| 3,806,452 | 4/1974 | Walker | 261/93 X |
| 3,814,396 | 6/1974 | DiGregorio et al. | 261/93 |
| 3,829,068 | 8/1974 | Hohne | 261/36 R |
| 3,865,910 | 2/1975 | Hori | 261/93 |
| 3,917,763 | 11/1975 | Schafer | 261/87 |

FOREIGN PATENT DOCUMENTS

| | | | |
|---|---|---|---|
| 879,081 | 4/1953 | Germany | 261/93 |
| 39,994 | 4/1914 | Sweden | 261/93 |
| 503,165 | 4/1939 | United Kingdom | 261/93 |
| 643,948 | 9/1950 | United Kingdom | 261/93 |

Primary Examiner—Tim R. Miles
Assistant Examiner—Richard L. Chiesa
Attorney, Agent, or Firm—John C. LeFever

[57] ABSTRACT

A rotatable bell is provided having a generally downwardly diverging shape about a central vertical axis, with the outer wall surface of the bell including a circumferentially extending jet flow surface portion with a plurality of gas flow wall openings circumferentially disposed around the base part thereof. Liquid is flowed downwardly over the jet flow surface portion of the wall from the upper part to the base part thereof to provide a high shear jet flow of liquid into which gas is injected for gas-liquid contacting and bulk mixing thereof.

14 Claims, 9 Drawing Figures

APPARATUS FOR SPARGING GAS INTO LIQUID

BACKGROUND OF THE INVENTION

1. Field of the Invention

This invention relates generally to apparatus for sparging gas into liquid for gas-liquid contacting and bulk mixing thereof.

2. Description of the Prior Art

In carrying out mass-transfer processes between gases and liquids, it is common practice to introduce the gas into the liquid in the form of small bubbles. In such manner a large aggregate interfacial surface area between the gas and liquid may be generated to provide correspondingly high rates of mass transfer.

When the volume of gas to be introduced into the liquid is comparatively small in relation to the liquid volume, sparging systems are frequently employed. The sparger is typically fabricated with small apertures through which gas in injected into the liquid, to provide a relatively fine dispersion of gas bubbles in the liquid undergoing treatment. In such systems, the sparger is commonly positioned at the bottom of a tank so that the small gas bubbles rise slowly through the liquid to provide an extended period of gas-liquid contacting.

When a submerged sparger is employed for gas-liquid contacting in a large body of liquid, it is generally desirable to employ means for bulk mixing of the liquid in the tank. Bulk mixing is utilized to eliminate the conditions under which stagnant liquid zones would otherwise form and to insure that a high mass-transfer gradient is maintained between the gas and liquid and that liquid is recirculated to the location at which the gas is introduced. Bulk mixing is particularly important in applications involving liquids containing solids or particulate matter which must be retained in suspension during the treatment step. Examples of such applications include fermentation, flocculation and activated sludge wastewater treatment.

Thus, in submerged sparger systems the energy required to operate the system generally comprises a portion which is extended to introduce the gas into the liquid in the form of small bubbles and a portion which acts to create bulk circulation in the liquid volume being treated. Accordingly, the efficient use of the energy required for bulk mixing is of prime importance and equipment which employs such energy for the dual purpose of improving gas-liquid contact as well as bulk mixing are favored by reason of their relatively high efficiency. Unfortunately, the prior art systems fail to efficiently integrate the gas injection and bulk circulation functions, and thereby fail to exploit the expended energy in a fashion which is mutually beneficial to both purposes. In other words, these systems fail to realize a significant augmentation to the effect of the one mechanism by the action of the other mechanism.

In processes involving interphase mass transfer, the resistance to such transfer is imposed by the penetration fluid films which exist at the interface between the respective phases and the magnitude of the resistance is a function of the depth of such films. In liquid-gas systems, it is well known to these film depths and the associated mass transfer resistance can be decreased by creating turbulent shearing stresses in the fluid film interfacial region. It is also known that such shearing stresses can increase the interfacial area available for mass transfer by reducing the size of the gas bubbles in the turbulent liquid and by increasing the rate of renewal of the interfacial surface. The shearing stresses can be viewed as creating shear planes over which a slipping or sliding occurs between contiguous layers of fluid, and as a consequence, steep flow velocity gradients exist through the depth of the fluid film interface. The thickness of the interfacial fluid film is directly related to the velocity gradient developed by the turbulent shearing stresses. Despite the knowledge of such mass-transfer enhancement mechanisms, it has not been possible to achieve high energy utilization when such mechanisms are employed because of the turbulent energy dissipation and decay associated therewith which cause a rapid degradation of the energy resident in the respective fluid flows.

The simplest submerged sparger systems involve introduction of the gas into the liquid medium by passage of the gas through a stationary aperture. The size of the resulting formed bubbles are a function of the dimensions of the aperture, the shear stress (which in turn is related to the aperture size, gas flow rate, fluid viscosities and densities) and the interfacial surface tension. Because the surface area to volume ratio of the gas bubbles increases with decreasing bubble diameter, the stationary spargers are usually fabricated with very small apertures in order to promote the formation of small bubbles. The introduction of gas through a porous ceramic medium is a common industrial practice. In such systems, energy must be expended first to overcome the pressure drop created by the flow of gas through the aperture and second to form a gas bubble, which formation requires the expenditure of an amount of work to increase the liquid/gas contact area within the enveloping body of liquid. However, the stationary sparger system is not designed to further enhance mass transfer either at the point of bubble formation or throughout the bulk-liquid volume. In the absence of a significant "gas lift" of the liquid by the gas, the work is expended for the sole purpose of creating surface area over which mass transfer can occur and the sparger is not particularly efficient in its use of energy expended.

Recognizing the inherent inefficiency of simply bubbling gas into a liquid, the prior art has proposed a sparging system in which gas is introduced into a body of liquid through a "bubble dispenser" disposed in a confined flow passage and the liquid is circulated downwardly through the confined flow passage to increase the retention time of the bubbles in the liquid, with the gas bubbles being displaced from the flow passage by crowding at the outlet end thereof.

In addition to increasing the retention time, the fresh supply of circulated liquid to the bubble-emitting "disperser" in the flow passage maintains a high concentration gradient through the interfacial fluid films. Despite these advantages, the resistance to mass transfer imposed by the interfacial fluid films is not materially affected by the downwardly flowing water and in this respect, the apparatus is comparable to a rudimentary stationary sparger.

Various sparger designs have also been proposed by the prior art in which gas bubbles are injected into a flowing system of liquid which is conveyed to a shearing zone, as for example in the vicinity of a high shear propeller. In such zone the bubble size is reduced as larger bubbles are sheared to form smaller bubbles, and the liquid may be given an appreciable downward or radial velocity serving to increase the bubble residence time in the liquid. The shearing action in this zone also serves to decrease the interfacial film resistance. Such type of sparging system is able to achieve comparatively high rates of mass transfer due to the foregoing effects, but does not employ input energy most efficiently. This is because the three process steps of creating bubble surface area, providing a liquid stream to carry the bubbles from the bubble formation zone to the shear zone, and shearing the so-conveyed bubbles in the shearing zone are each separately and independently performed, so that this combination involves little or no augmentation of the effect of the one mechanism by the action of the other mechanisms.

In general, the prior art sparging systems either do not provide adequate shearing action at the point of gas introduction to reduce the intrafacial film resistance for high mass transfer rates or else do not efficiently utilize the energy supplied to the system for mass transfer at the point of gas injection or for bulk mixing and gas circulation throughout the body of the liquid.

As indicated above, sparging systems are frequently employed to treat liquids containing suspended solids. When the gas flow openings of the sparger are small in size, the solids may clog the sparger openings, adversely affecting the system performance and requiring periodic shutdown and cleaning of the sparger. Large gas flow openings may ameliorate the problem but tend to produce correspondingly larger gas bubbles which reduce the aggregate interfacial surface area and mass transfer efficiency of the system.

An additional deficiency of many prior art sparging systems relates to the relationship between the power drawn by the sparger system and the gas load which it is required to handle. In systems which encounter a changing process load, the optimal gas feed rate may change accordingly and the apparatus must be capable of accommodating such changes. For example, in sparger systems wherein the gas-liquid dispersion passes through an impeller, as for example for flow directing of the liquid to increase bubble contact time, for bubble shearing or simply for conveying liquid, the power drawn by the impeller is highly sensitive to gas feed rate. Such apparatus characteristically exhibits a significant increase in power draw with a decrease in gas load, and since the power train must satisfy the full range of operating conditions its size is significantly greater than that required to satisfy operation at full gas load.

Accordingly, it is an object of the present invention to provide an improved apparatus for sparging gas into liquid.

It is also an object of the invention to provide a sparging apparatus for promoting gas-liquid contact which is particularly efficient in its utilization of energy, which permits a large amount of gas to be dissolved per unit of energy expended and which maintains a high rate of bulk circulation within the body of liquid being treated.

It is a further object of the invention to provide a submerged sparger which offers a wide operating range in terms of the liquid and gas processing rates.

Other objects and advantages of the invention will be apparent from the ensuing disclosure and appended claims.

SUMMARY OF THE INVENTION

The foregoing objects are achieved in the practice of this invention by a sparging apparatus which employs energy in an especially efficient manner, first to create a high localized velocity jet stream, with which high shearing stresses are associated, and into which gas is introduced, and second to direct the turbulent jet stream for efficient bulk mixing of the liquid undergoing treatment.

Briefly, the invention relates to an apparatus for sparging gas into liquid which includes a vertically oriented rotatable shaft and a hollow rotatable bell having a generally downwardly diverging symmetrical shape about a central vertical axis, connected to the lower end of the shaft for rotation therewith. The outer wall surface of the bell includes a circumferentially extending jet flow surface portion with a plurality of gas flow wall openings circumferentially disposed around the base part thereof, and a wall surface sealing segment joined to the base part of the jet flow furface portion to form a liquid seal for the gas flow openings. The jet flow surface portion of the wall has a surface profile of continuous positive curvature from the base part to the upper part thereof with a base angle $\beta$ of between about 0° and about 60° and an apex angle $\alpha$ of between about 0° and about 65° wherein $\beta$ is the angle formed in a radial plane between a tangent to the base part surface portion and a horizontal radius line extending from the bell axis to the point of tangency and $\alpha$ is the angle formed in a radial plane between a tangent to the upper part surface portion and the bell axis. Axial flow pumping means are disposed above the rotatable bell aligned for flowing liquid downwardly over the jet flow surface portion of the bell wall from the upper part to the base part thereof, to provide a high shear jet flow of liquid over the gas flow openings. The apparatus also includes means for introducing pressurized gas into the interior of the rotatable bell for discharge therefrom through the gas flow openings into the high shear jet flow of liquid, to provide a localized dispersion of the discharged gas in the jet flow liquid for gas-liquid contacting and bulk mixing thereof.

In the operation of the above-described sparging apparatus, the axially discharged pumped liquid flowing downwardly over the rotating bell wall creates a high velocity jet flow of liquid over the jet flow surface portion of the wall. At the base part of the jet flow surface portion of the wall, the gas is injected into a region of liquid proximate the gas flow openings in which the combination of the "chopping" action of the rotating bell and the high shear forces associated with the liquid jet flow create an environment in which high mass transfer efficiencies are achieved. The apparatus thus achieves a significant improvement over prior art apparatus in terms of the efficiency with which it directs input energy for the purpose of gas dissolution in a large body of liquid and additionally has the features of high bulk mixing capability, insusceptibility to plugging in the presence of liquid entrained solids, and a broad operating range in terms of gas load.

As used herein, the term "wall surface sealing segment" means wall member means which when joined to the base part of the jet flow surface portion of the bell wall form a liquid seal for the gas flow openings, so that the gas introduced into the interior of the bell is discharged therefrom only through the gas flow openings. The wall surface sealing segment may for example comprise a vertical cylindrical or outwardly flaring skirt or a horizontal plate closure member, as described hereinafter, whose function is to form an extension of the bell wall for preventing issuance of gas from around the bottom periphery of the jet flow surface portion base part rather than passage of the gas through the gas flow wall openings, as is desired.

In accordance with the invention, the jet flow surface portion of the bell wall has a surface profile of uniform positive curvature from the base part to the upper part thereof. As used herein, the expression "continuous positive curvature" means that the change of slope of the outside surface of the bell's jet flow surface portion is non-negative (i.e., $\geq 0$) when successive slopes are taken in a radial plane along the outside wall surface at increasing vertical distances from the base part thereof. In other words, the jet flow surface portion of the bell wall has a surface profile in a radial plane which is devoid of any convexities. Accordingly, the bell presents a constriction to the jet of liquid flowing downwardly from the overlying pumping means and "squeezes" the jet stream so that the cross-sectional area of its flow path is greatly reduced. High velocities are thus achieved in the liquid stream in the localized boundary layer at the surface of the cone; streamlined jet flow is maintained and a velocity gradient is developed along the surface of the jet flow surface portion of the bell wall so that the velocity increases and is maximized at the base part thereof without encountering the turbulent momentum transfer common in free-jet expansion. Under these conditions, a high shear jet flow of liquid is provided over the gas flow openings at the base part jet flow surface portion, to effect an efficient mass-transfer contacting the bulk mixing of the respective gas and liquid phases.

DESCRIPTION OF THE PREFERRED EMBODIMENTS

Figure 1:
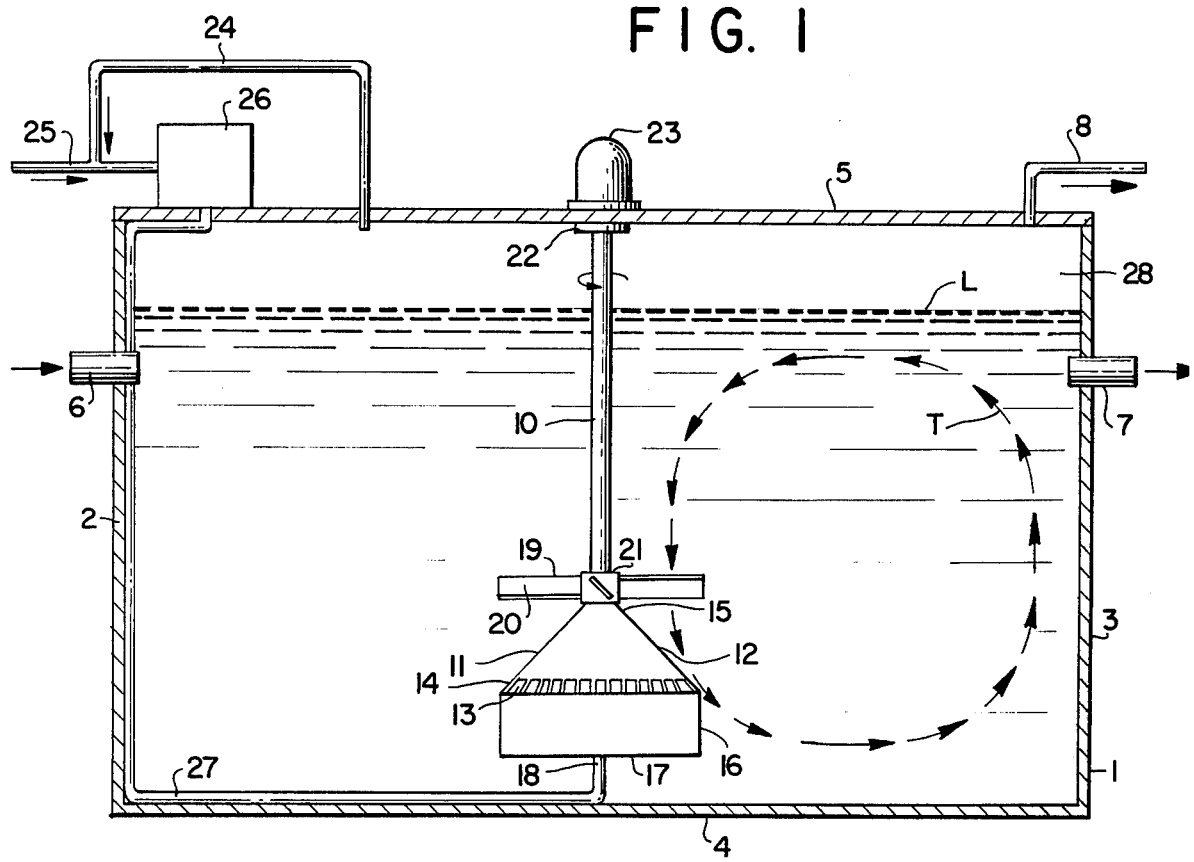
FIG. 1 is a sectional elevational view of a liquid aeration tank utilizing sparging apparatus constructed in accordance with the present invention.

Referring now to the drawings, FIG. 1 shows a sectional elevational view of a liquid aeration tank featuring a sparging apparatus according to one embodiment of the invention. The aeration tank 1 comprises vertically extending side walls 2 and 3, floor 4 and a cover 5 gas-tightly joined to the upper ends of the side walls for enclosure of the interior volume of the tank. Such type of aeration zone is particularly suitable for the practice of aeration of activated sludge mixed liquors in oxygenation treatment of BOD-containing wastewater, as for example is taught by U.S. Pat. Nos. 3,5547,813 – 3,547,815 to J. R. McWhirter et al. In accordance with the McWhirter et al. teachings, at least one enclosed covered aeration chamber is employed wherein the liquid undergoing treatment is intimately contacted in the presence of activated sludge with oxygen enriched gas from an overlying gas space to dissolve the oxygen necessary for aerobic biological activity. Such oxygenation systems are able to operate at biological suspended solids levels several times greater and aeration detention periods several times less than those of conventional air aeration activated sludge systems while maintaining comparable or higher overall levels of treatment. In application to such systems, the sparger apparatus of the present invention provides a number of important economic and performance advantages. More specifically, relative to the spargers of the prior art, the invention permits high utilization of oxygen in the aeration of gas, reduced power costs for compression of the oxygen feed gas, reduced power costs for agitation of the activated sludge-containing mixed liquor, high dissolved oxygen content of the mixed liquor and reduced mixed retention time in the aeration zone.

The aeration tank 1 in the FIG. 1 embodiment features a liquid inlet conduit 6 and liquid outlet conduit 7, both positioned below the liquid level L. The sparging apparatus in this embodiment includes vertically oriented rotatable shaft 10 and hollow rotatable bell 11 having a generally downwardly diverging symmetrical conical shape about a central vertical axis co-incident with the vertical axis of shaft 10 and connected to the lower end of the shaft for rotation therewith. The outer wall surface of the bell includes a cicumferentially extending jet flow surface portion 12 with a plurality of gas flow wall openings 13 circumferentially disposed around the base part 14 thereof. Wall surface sealing segment 16, comprising a cylindrical wall member depending vertically downwardly from the base part of the jet flow surface portion around the circumference thereof and open at its bottom end 17, is joined to the base part of the jet flow surface portion 12 to form a liquid seal for the gas flow openings. An axial flow pumping impeller 10 is fixedly attached to shaft 10 by means of hub 21. The impeller is joined to the shaft at its lower end and proximate the rotatable bell and features outwardly extending blades 20 which are aligned for flowing liquid downwardly over the jet flow surface portion 12 of the bell wall from the upper part 15 to the base part 14 thereof. Such means are employed to provide a high shear jet flow of liquid over the gas flow openings 13, as will be described in greater detail hereinafter. The shaft 10 is operatively connected to motor drive means 23 mounted on the cover of tank 1 by passage through a suitable opening in the cover which is gas-tightly sealed by liquid seal element 22.

The means provided for introducing pressurized gas into the interior of the rotatable bell includes gas delivery line 27 joined at one end to compressor 26, with its other end 18 extending vertically upwardly from the floor 4 of tank 1 and terminating with an open end 5 disposed within the skirt extension of the rotatable bell. Aeration feed gas is introduced to the compressor 26 by feed line 25 together with recurculated aeration gas from the gas space 28 overlying the liquid level, the recycle gas being passed through recirculation conduit 10 24 from the gas head space 28 to feed line 25. A gas discharge conduit 8 is also joined in flow communication with the gas space 28 for discharge of effluent gas from the system.

In operation, the motor drive means 23 are actuated to rotate the hollow rotatable bell 11 and the axial flow pumping impeller 10 disposed above the bell at a rotational speed of for example 100 rpm. Simultaneously, feed aeration gas is passed to the intake of compressor 26 and the resultant pressurized gas is flowed through delivery line 27 to the open end 18 thereof. In this manner gas is emitted into the interior of the rotatable bell and is discharged therefrom through the gas flow openings 13 into the high shear jet flow of liquid passing over the openings. At the gas flow openings, the emitted gas is sheared or "chopped" by the rotating bell wall and by the high shear jet flow of liquid to provide a localized dispersion of the discharged gas in the jet flow liquid for gas-liquid contacting and bulk mixing thereof.

Dimensionally, the bottom of the jet flow surface portion should be vertically spaced from the floor 4 of tank 1 at a distance which is not greater than 2.0 times the diameter of the bell, as measured at the bottom of the jet flow surface portion. Such relationship insures that the jet flow of liquid, possessing a substantial vertical component in the downward direction and a substantial radial component in the outward direction as it is discharged from the base part of the jet flow surface portion of the bell wall, will provide suitably high bottom velocities in the liquid at the floor of the tank, to prevent deposition of any suspended solids in the liquid and to induce an extended circulational flow of liquid and gas, as indicated by the toroidal flow loop T. Under such conditions, a thorough mixing and "turnover" of the liquid in the tank is achieved as the gs contacted liquid is circulated repetitively through the gas injection sparging zone.

Figure 2:
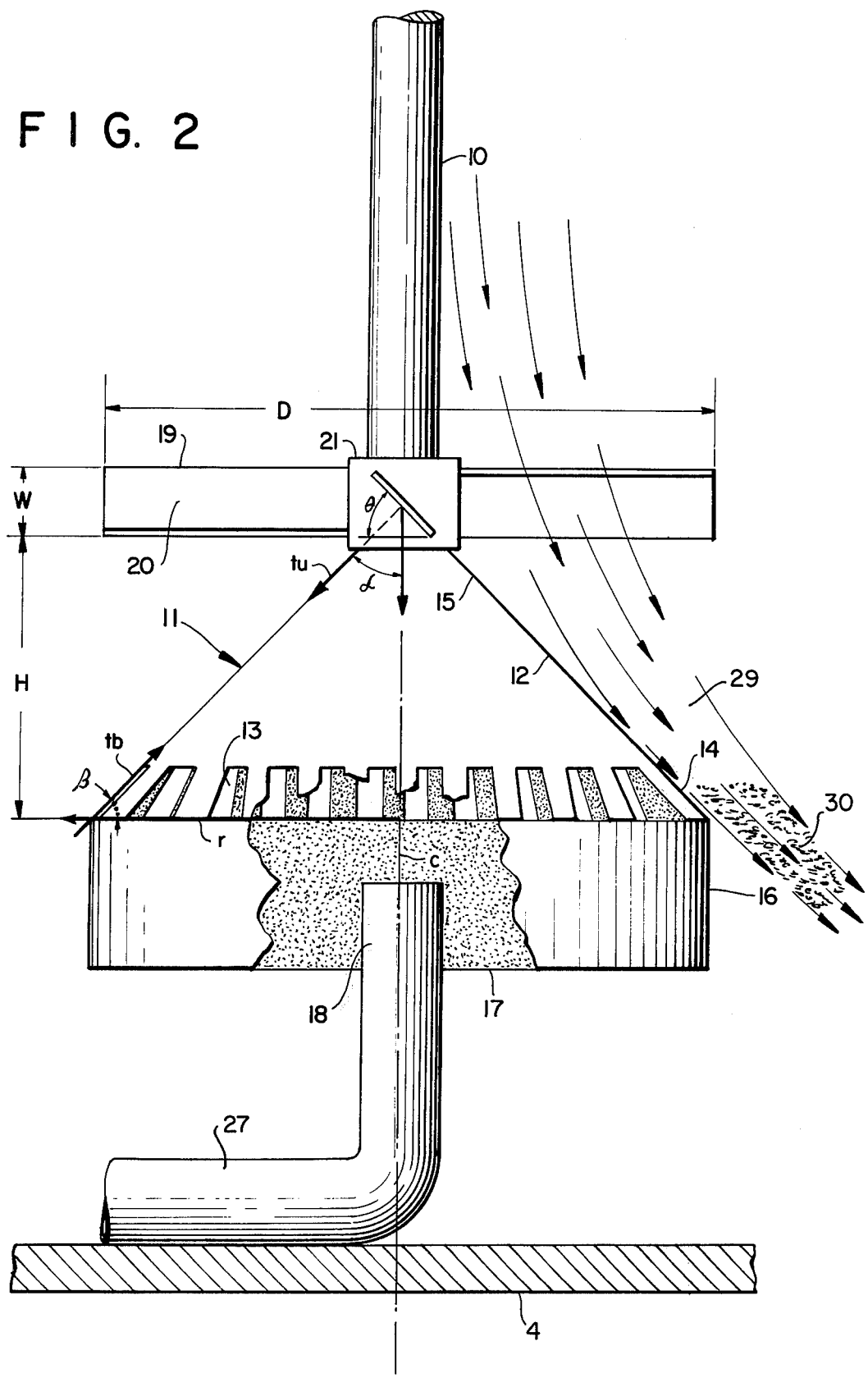
FIG. 2 is an enlarged partially cut away elevational view of the sparging apparatus of FIG. 1, showing the structural and operational features thereof.

FIG. 2 shows an enlarged, partially cut away view of the FIG. 1 sparging apparatus. As shown in the drawing, the rotatable bell 11 is coaxially aligned with the drive shaft 10, both being symmetrical about the central vertical axis C, and the diameter D of the axial flow pumping impeller 19 is equal to the maximum diameter of the bell, as measured horizontally across the cylindrical skirt 16. Preferably, the liquid flow area within the diameter D scribed by the impeller blade tips is between 0.25 and 2.25 times the cross sectional area of the bell in a horizontal plane at the base part of the jet flow surface portion of the bell wall, in order to provide suitably high liquid velocity and shear conditions at the poit of gas injection into the jet flow stream. The impeller as illustratively shown feature 4 pitched planar turbine blades 20 which are disposed at an angle $\theta$ with respect to the hoizontal plane containing the bottom edges of the impeller blades. The angle $\theta$ may in practice suitably be in the range of 10° to 45°. The dimension W of the blades is the projected blade width in a plane parallel to both the longitudinal center line of the blade and the axis $c$ of shaft 10. In practice, pitched blade impeller having a W/D ratio in the range of from 0.11 to 0.25 or a marine propeller with a pitch to diameter ratio of from about 1.0 to 2.0 may advantageously be employed.

In accordance with the invention, the jet flow surface portion of the bell wall outer surface has a surface profile of continuous positive curvature from the base part to the upper part thereof with a base angle $\beta$ of between about 0° and about 60° and an apex angle $\alpha$ of between about 0° and about 65° wherein $\beta$ is the angle formed in a radial plane between a rangent to the base part surface portion and a horizontal radius line extending from the bell axis to the point of tangency and $\alpha$ is the angle formed in radial plane between a tangent to the upper part surface portion and the bell axis. The base angle $\beta$ should not exceed about 60°, in order to provide high velocities and effective shear condition at the point of gas injection at the base part of the jet flow surface portion, as well as to insure that a sufficient radial velocity component is imparted to the jet flow stream to achieve sufficient bulk mixing in the liquid undergoing treatment. At valves of $\beta$ above 60°, detrimental free expansion of the jet flow stream tends to occur which in turn results in the dissipation of energy, i.e., irreversible energy losses in the liquid flow stream. The apex angle $\alpha$ likewise should not exceed about 65° so that the bell surface is capable of forming an efficient jet flow stream; above values of 65° the bell surface becomes increasingly "flat" to the impinging liquid flow and tends to damp liquid velocity and flow energy and cause turbulence in the down pumped liquid.

In the FIG. 2 embodiment, the jet flow surface portion 12 of the bell 11 has a linear surface profile from the base part 14 to the upper part 15 thereof. Accordingly, apex angle $\alpha$, measured in a radial plane between the tangent to the upper part surface portion 15, $t_u$, and the bell axis $c$, and the base angle $\beta$, as measured in the radial plane between the tangent to the base part surface portion 14, $t_B$, and the horizontal radius line $r$ extending from the bell axis $c$ to the point of tangency, are complimentary, i.e. their sum is 90°, with angle $\alpha$ being approximately 45° and base angle $\beta$ being approximately 45°. For a bell having a jet flow surface portion with a linear surface profile, the base angle $\beta$ should be between about 30° and about 60°, and the apex angle $\alpha$ should be between about 30° and about 60°, as based on the considerations set forth hereinabove.

In operation, the axial flow impeller 19 creates a liquid jet whose diameter approximates the diameter of the impeller. The conical bell represents a constriction to the liquid flow and "squeezes" the jet flow stream so that the cross-sectional area of its flow path is greatly reduced. High velocities are thus achieved in the localized boundary layer at the surface of the jet flow surface portion.

In accordance with the invention, streamlined jet flow is maintained and a velocity gradient is developed along the conical surface in which the velocity increases and is maximized at the base part of the jet flow surface portion without encountering the turbulent momentum common in free-jet expansion such as in prior art systems in which liquid is flowed at high velocity through a gas injection zone. The vertical height H of the jet flow surface portion of the bell wall in this embodiment is equal to about 1.0 R where R = $\frac{1}{2}$D and R represents the radius of the jet flow surface portion measured at the bottom of the base part surface portion 14. In the general practice of the present invention, the aspect ratio H/R of the jet flow surface portion should be in the range of 0.5 to 1.0. At aspect ratio values of less than 0.5, the jet flow surface portion tends to yield a surface which is excessively oblique to the jet flo stream so that damping of the liquid velocity, turbulence and loss of flow energy in the liquid stream are likely to result. At aspect ratio values above 2.0, free expansion of the jet flow stream occurs thereby wasting the flow energy of the stream.

As discussed above in connection with FIG. 1, pressurized gas is introduced into the interior of the bell by as delivery line 27 which terminates within the skirt 16 of the bell at the open end 18. The function of the skirt sealing segment is to provide a liquid seal for the gas flow openings so that the inroduced gas is preferentially discharged through the openings. If the skirt were not present, the introduced gas may, particularly at higher gas introduction rates, issue from the bell around the full periphery of the base part of the jet flow surface portion and not be sufficientely sheared by the action of the wall surface between the adjacent gas flow openings, with consequent adverse effect on the mass transfer efficiency of the overall system. Thus the sealing segment of the bell wall permits the exterior hydrostatic liquid head outside the bell to provide a liquid seal for the gas openings so that the introduced gas is sheared by the rotating bell wall upon discharge from the openings into the high velocity, high shear jet flow stream 29 to provide a localized dispersion of fine bubbles for gas-liquid contacting the bulk mixing in the liquid flowing from the sparging zone.

Figure 3:
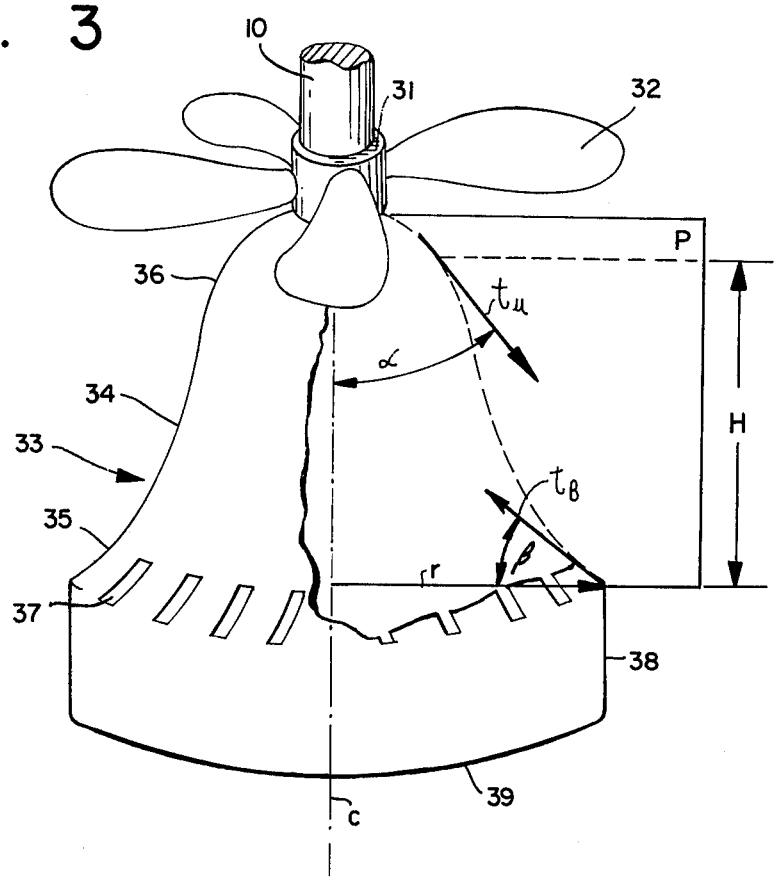
FIG. 3 is a perspective view of another sparging apparatus constructed in accordance with the invention, featuring a bell wall jet flow surface portion with a hyperbolic surface profile.

FIG. 3 represent another embodiment of the invention suitable for use in the liquid treatment tank of FIG. 1. In this embodiment, the axial flow pumping means comprise a 4-bladed marine propeller 32 associated with hub number 31. The hub number 31 interconnects shaft 10 and rotatable bell 33 for rotation about central vertical axis c. The wall of the bell includes circumferentially extending jet flow surface portion 34 having plural gas flow openings 37 disposed around the base part 35 thereof. A cylindrical skirt wall surface sealing segment 38, open at is lower end 39, is joined to the base pat of the jet flow surface portion to form a liquid seal for the gas flow openings, in the same manner as previously described in connection with the embodiment of FIGS. 1 and 2.

In the FIG. 3 embodiment, the jet flow surface portion of the bell wall outer surface has a hyperbolic surface profile S extending from the base part 35 to the upper part 36 thereof. The projected vertical height of the jet flow surface portion of the bell wall is shown as H. The portion of the bell wall above the jet flow surface portion is characterized by a convex surface profile and is desirably as small as possible in relation to the total wall surface of the bell so as to minimize the interference with the development of the jet flow stream over the jet flow surface portion of the bell wall. The base angle $\beta$ of the jet flow surface portion 34 in this embodiment, as measured in the radial plane P between the tangent $t_B$ to the base part surface portion and the horizontal radius line $r$ extending from the bell axis C to the point of tangency, is approximately 35°, and the apex angle $\alpha$, as measured in the radial plane P between the tangent $t_u$ to the upper part surface portion 36 and the bell axis C, is approximately 33°.

Figure 4:
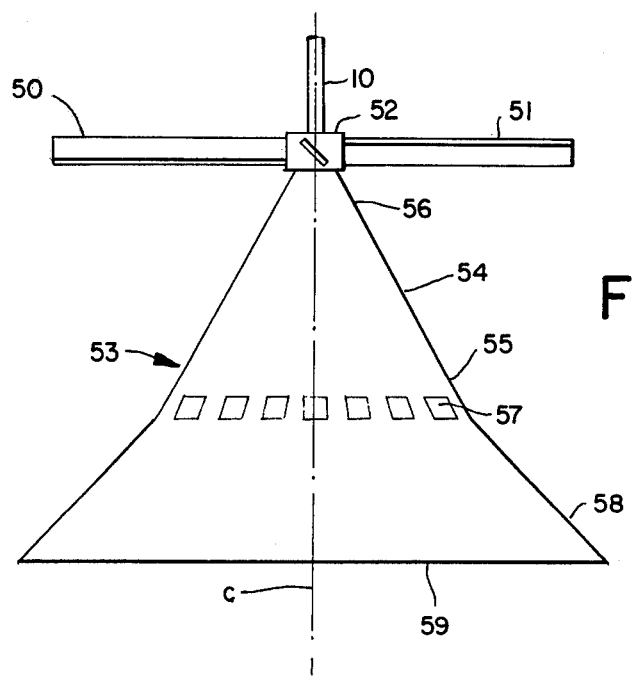
FIG. 4 is an elevational view of still another sparging apparatus constructed in accordance with the invention, featuring a downwardly diverging wall surface sealing segment.

Another alternative embodiment of the invention is shown in FIG. 4, wherein rotatable bell 53 is connected to shaft 10 by hub member 52. Associated with the hub member is an axial flow pumping impeller 50 comprising blade elements 51, for flowing liquid downwardly over the jet flow surface portion 54 of the bell wall from the upper part 56 to the base part 55 thereof. Pressurized gas is introduced into the interior of the bell through the lower open end 59 of the wall surface sealing segment 58 in the manner previously described in connection with the FIG. 1-3 embodiments, and is discharged from the bell through gas outlet openings 57 into the high shear jet flow stream passing over the openings.

Figure 5:
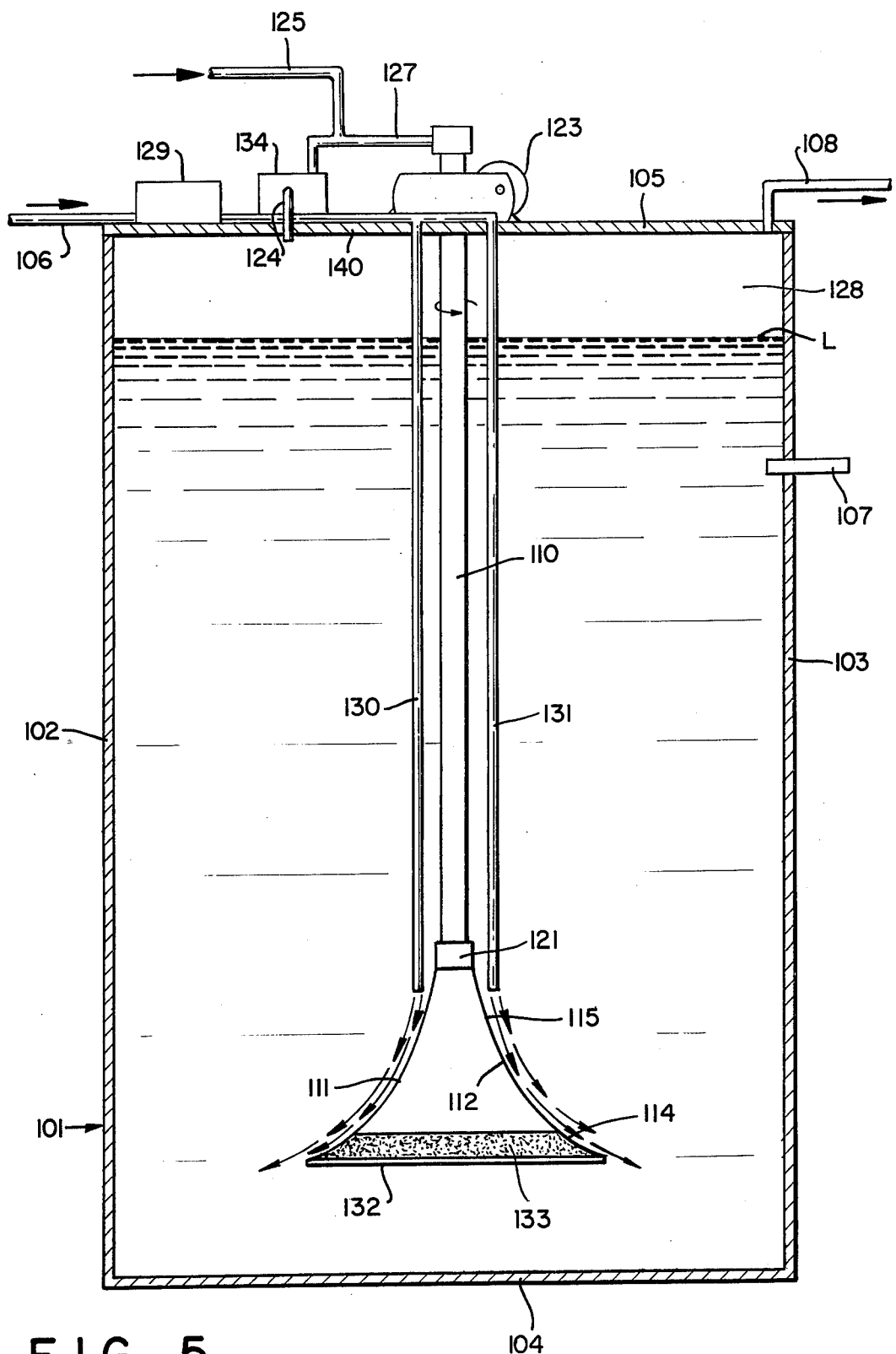
FIG. 5 is a sectional elevational view of a gas-liquid contacting tank utilizing sparging apparatus according to another embodiment of the invention.

FIG. 5 is a sectional elevational view of a gas-liquid contacting tank utilizing sparging apparatus according to another embodiment of the invention. The contacting tank 101 comprises vertically extending side walls 102 and 103, floor 104 and cover 105 for gas-tight sealing of the tank enclosure. The sparging apparatus comprises vertically oriented rotatable shaft 110 and rotatable bell 111 rigidly connected to the lower end of the shaft by means of the joining member 121. The bell has a generally downwardly diverging shape symmetrical about its central vertical axis, with the bell wall outer surface including a circumferentially extending jet flow surface portion 112 comprising porous sintered metal wall section 133 at the base part 114 thereof. The porous metal wall section provides a plurality of gas flow wall openings in the wall surface for gas injection into the liquid flowed thereover. In this embodiment the jet flow surface portion of the bell wall has a hyperbolic surface profile from the base part 114 to the upper part 115 thereof. The wall surface scaling segment of the bell comprises a generally horizontally disposed plate closure number 132 joined at its periphery to the base part 114 of the jet flow surface portion to form an enclosed interior volume in the rotatable bell.

Gas is introduced into the rotatable bell by a passageway in the rotatable shaft 110 communicating at its lower end with the interior volume of the bell and joined at its upper end with pressurized gas supply means. The latter means include gas inlet line 125 to which feed gas is introduced and conveyed by conduit to the passageway in the shaft 110. The feed gas stream is augmented by recirculated gas from the gas space 128 overlying the liquid level L in the tank. Recirculation gas flows through conduit 124 communicating with the gas head space 128 and enters recirculation compressor 134 from which it passes through conduit 127 with the make-up feed gas. Excess contacted gas is vented from the gas head space through discharge conduit 108 which may suitably have valve control means (not shown) disposed therein, to maintain the recirculation gas at the desired purity level.

Influent liquid is introduced into the system through feed conduit 106 and flows to liquid pressurizing pump 129. The resultant pressurized liquid is discharged into manifold line 140 from which it is flowed through liquid discharge conduits 130 and 131. The liquid discharge conduits are open at their lower ends and discharge liquid downwardly for flow over the jet flow surface portion 112 of the bell wall from the upper part 115 to the base part 114 thereof. Simultaneously, gas is discharged from the bell through the gas flow pore openings in the sintered porous metal wall section 133 to provide a localized dispersion of discharged gas in the jet flow liquid stream for gas-liquid contacting and bulk mixing thereof. After the requisite liquid treatment period, gas-contacted liquid is discharged from the tank 101 through discharge conduit 107.

Figure 6:
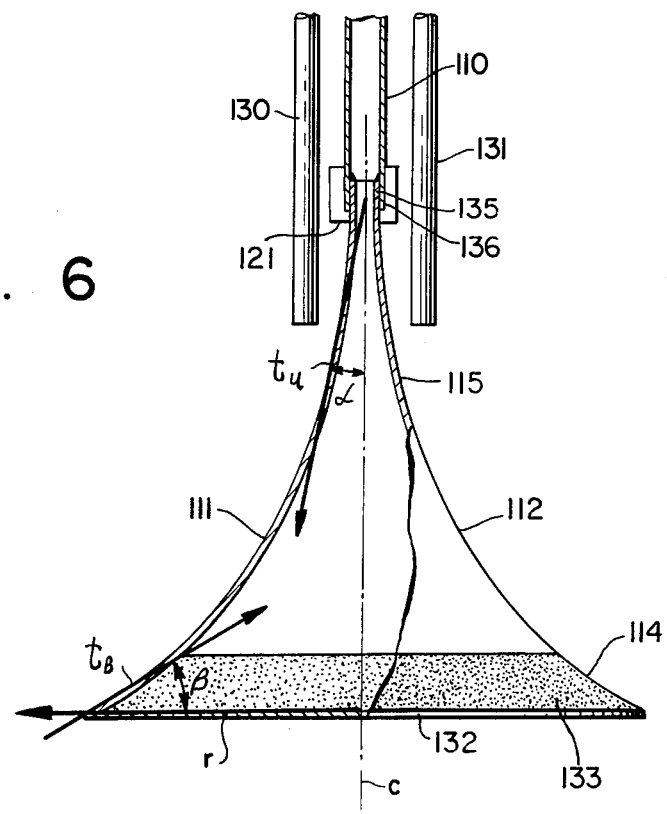
FIG. 6 is an enlarged, sectional elevational view of the sparging apparatus of FIG. 5, showing the details thereof.

FIG. 6 is a partial sectional elevational view of the sparging apparatus of FIG. 5. As shown, the rotatable bell 111 is enclosed at its lower end by plate closure member 132 to form a liquid seal for the gas flow openings in the porous metal wall section 133. The enclosed interior volume communicates with the gas flow passageway in rotatable shaft 110, with the uppermost end 135 of the bell wall being joined to the lower end 136 of the shaft as by welding within the connection member 121. The jet flow surface portion 112 of the bell wall has a hyperbolic surface profile from the base part 114 to the upper part 115 thereof. The jet flow surface portion has an apex angle $\alpha$ in a radial plane between the tangent to the upper part surface portion, $t_u$, and the bell axis c of approximately 14°, and a base angle $\beta$ in the radial plane between the tangent to the base part surface portion, $t_B$, and the horizontal radius line extending from the bell axis to the point of tangency between tangent $t_B$ and the base part surface portion, of approximately 33°. In this embodiment, the axial flow pumping means comprise the liquid discharge conduits 130, 131 which are disposed above the rotatable bell and aligned for flowing liquid downwardly over the jet flow surface portion of the bell wall from the upper part 115 to the base part 114 thereof, to provide a shigh shear jet flow of discharged liquid over the gas flow openings of the porous metal band 133. The porous metal blend 133 should preferably have pores of at least 50 microns in diameter in order to avoid clogging by particulate solids in the liquid or the introduced gas. It will be recognized that other types of gas flow openings could be employed in the embodiment shown in FIGS. 5 and 6, as for example slots or apertures in the base part surface portion, and that other porous media, e.g., porous ceramic, could be used in place of the sintered porous metal band described herein. Furthermore, although the liquid pumping means have been shown as comprising two discharge conduits, it will be recognized that more than two such conduits may be employed in spaced relation about the shaft 110, or alternatively, other types of liquid discharge means, e.g., nozzles, may suitably be used.

Figure 7:
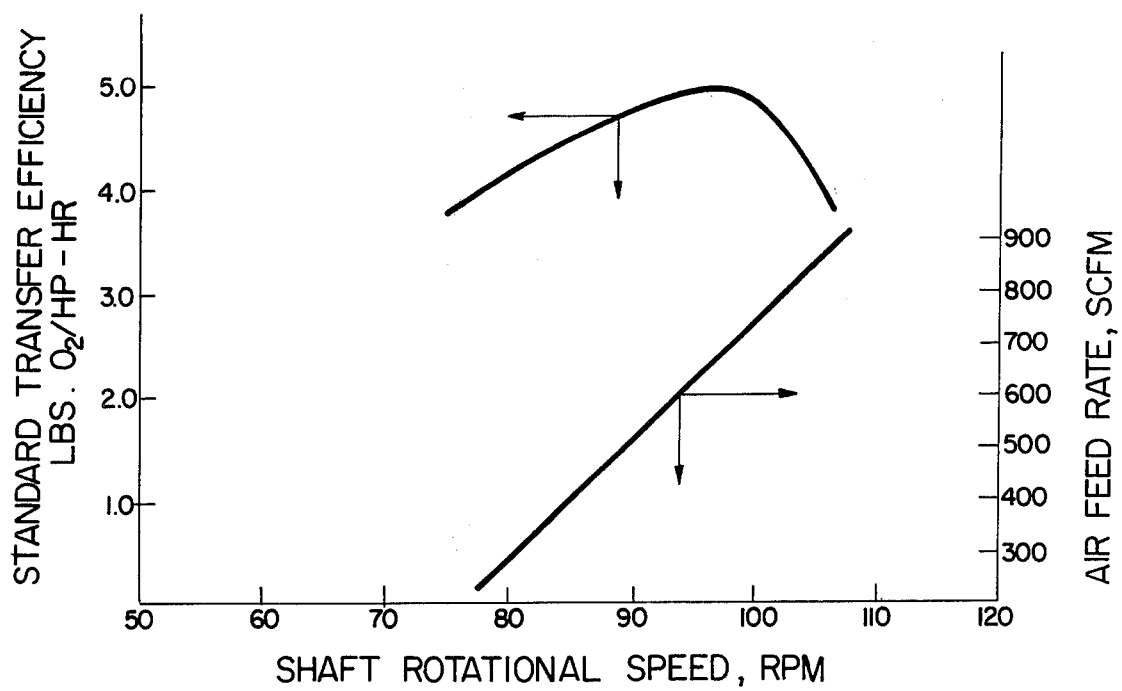
FIG. 7 is a graph illustrating the relation between standard transfer efficiency, aeration gas feed rate and rotational speed of the sparger, for a sparger of the type as shown in FIG. 1 and 2.

FIG. 7 is a graph showing the relationship between air standard transfer efficiency (STE), air feed rate and shaft rotational speed for an illustrative embodiment of the invention. Gas-liquid contacting aeration devices are commonly rated by the so-called "air standard transfer efficiency" which identifies the capability of the apparatus to dissolve oxygen from air into tap water containing zero concentration dissolved oxygen at one atmosphere pressure and 20° C temperature. In applications involving the activated sludge process, for example, it is common practice to specify an air transfer efficiency of at least 1.5 lbs. $O_2$/HP-hr., in order to economically achieve the requisite mass transfer performance. For purposes of measuring the air standard transfer efficiency, the power used in rating the device is the total power consumed both for agitating (mixing) of the liquid and for gas-liquid contacting.

The apparatus employed to generate the data plotted in FIG. 7 is of the general type shown in FIGS. 1 and 2. The downward pumping impeller 19 was a 54 inch diameter (=D), 32° pitched blade turbine and the diameter of the rotating conical bell, as measured at the bottom of the jet flow surface portion 12, was 54.8 inches. The height of the skirt sealing segment 16 was 18 inches, the vertical projected height. H of the jet flow surface portion was approximately 32 inches and the vertical distance between the bottom of the skirt sealing segment and the floor 4 of the tank 1 was 22 inches. The jet flow surface portion had an apex angle $\alpha$ of 45° and a base angle $\beta$ of 45°. The gas flow openings 13 were slots 3 inches in height and 0.5 wide uniformly circumferentially disposed around the base part 14 of the jet flow surface portion on 4.9 inch centers. The sparging apparatus was tested in an open tank having a square cross-section measuring 30 feet by 30 feet and containing 15 feet of tap water.

During the test, power input and air feed and oxygen dissolution rates were monitored. The STE obtained in the operation of the above-described apparatus was determined at various shaft rotational speeds. For each successive value of the rotational speed studied, the rate at which air was introduced internal of the cone was adjusted in order to maximize the STE. The resultant plots of data in the graph of FIG. 7 show that in the range of rotational speeds from 78 to 106 rpm with air feed rates of from about 225 to 860 SCFM, STE values of approximately 4.0 to 5.0 lbs. $O_2$/HP-hr. were achieved. Such high values are a consequence of the formation of a high shear, high velocity jet flow of liquid which at the point of gas injection is enhanced by the shearing action associated with the rotation of the bell wall, with streamline jet flow conditions being maintained along the jet flow surface of the bell wall to provide efficient utilization of the energy resident in the jet stream.

It has been established that a synergistic effect is achieved with the apparatus of this invention, between the individual gas dissolution mechanisms associated with the formation of a jet flow liquid stream on the one hand and the emission of gas from the rotating bell on the other hand. Thus, when the apparatus was tested under the above-described operational conditions with the bell uncoupled from the rotatable shaft and mounted stationarily in place, so that only the axial flow impeller was rotated by rotation of the shaft with gas being emitted into the jet flow stream from the stationary bell, a maximum STE of 2.4 lbs. $O_2$/HP-hr was achieved. Similarly, where the axial flow pumping impeller is absent from the system and only the bell is rotated, with gas injection from the rotating bell but without the formation of a jet flow liquid stream, STE values of 1.4 to 1.7 lbs. $O_2$/HP-hr have been established. Thus, the apparatus of this invention achieves substantially and unexpectedly higher STE values than can be achieved additively by the separate constituent mechanisms of gas dissolution.

In addition to the foregoing, it has been found that the apparatus of this invention affords stable operation over a wide range of gas flow rate operating conditions. In a further test, the sparging system as described above in connection with the FIG. 7 tests was comparatively evaluated against several prior art rotating sparger systems to generate the plot shown in FIG. 8, showing the percentage ratio of power consumption in the gassed mode, $P_G$, to power consumption in the ungassed mode, $P_0$, as a function of air feed rate to the sparging system.

In this test, the respective sparging systems were evaluated at a constant rotational speed of 86 rpm and various feed gas flow rates in he range of from 0 to 620 SCFM. FIG. 8 shows the results of the evaluation wherein power consumption in the gassed mode represents the power draw of the system at the given gas feed rate and power consumption in the ungassed mode is the power drawn at zero gas feed rate. Curve M represents the power ratio variation for the illustrative sparging apparatus of this invention, curve N represents a prior art system employing a multiplicity of radially extending apertured gas sparging arms attached to a rotating shaft and positioned beneath an axial flow, downwardly pumping impeller, and curve P represents a conventional flat disk radial discharge sparger of the commonly known type in which gas is introduced to an impeller comprising a circular disk with downwardly extending radial blades joined to the underside thereof, for shearing and radial dispersion of the introduced gas in the form of fine bubbles.

The prior art apparatus represented by curves N is of a type as disclosed and claimed in U.S. Pat. No. 3,775,307 to J. R. McWhirter et al. The apparatus had eight radially extending gas sparging arms spaced around the periphery of the rotating shaft, with a diameter of 54 inches, as measured by the circle scribed by the outer ends of the gas sparging arms during rotation. The axial flow, downwardly pumping impeller also had a diameter of 54 inches and comprised four pitched planar turbine blades disposed at a pitched angle 32° as measured relative to the horizontal plane containing the bottom edges of the impeller blades. This impeller had a W/D ratio of 1/6 where w is the projected blade width in a plane parallel to both the longitudinal centerline of the blade and the vertical axis of the shaft and D is the diameter of the impeller. Both the instant sparging apparatus of this invention (curve M) and the prior art multi-arm sparger (curve N) in this test were evaluated in an open tank measuring 30 feet by 30 feet and containing 15 feet of tap water.

Figure 8:
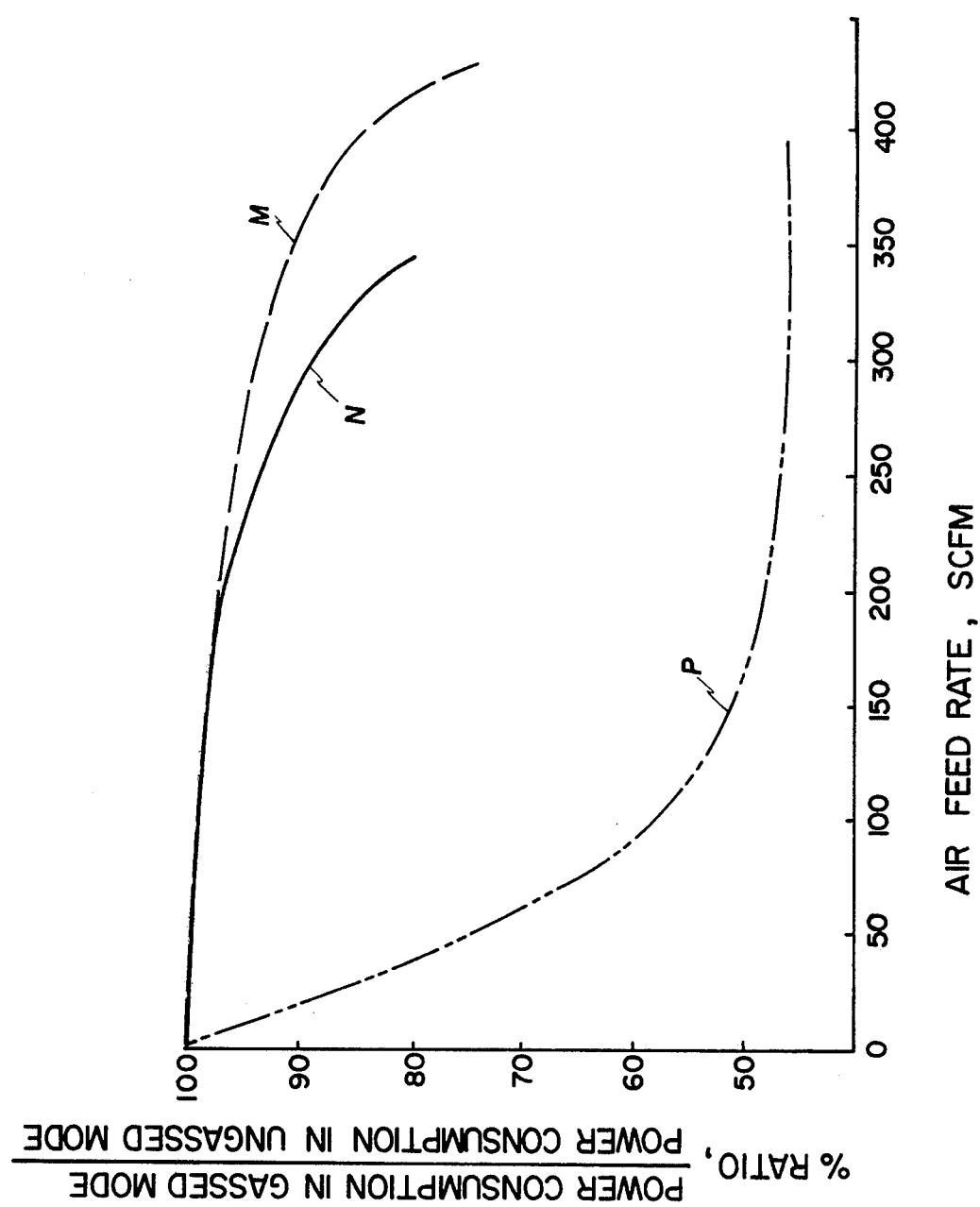
FIG. 8 is a graph of the ratio of power consumption of the sparger in the gassed operating mode to the power consumption of the sparger in the ungassed mode, plotted against gas feed rate, for various prior art spargers and a sparger constructed in accordance with the present invention.

Regarding the general shape of the curves shown in FIG. 8, the reduction of power draw at increased gas feed rates is a consequence of the larger percentage of gas being pumped by the impeller. A given impeller is able to "break up" a limited amount of gas into small bubbles, and with increasing gas feed rate, the impeller approaches a condition termed "flooding" in which the impeller is operating on a medium which is essentially gas.

Comparing the curves M and N, representing the instant invention and the prior art multi-arm sparger, respectively, FIG. 8 shows that for example at a power ratio of 90%, the gas handling capacity of the instant apparatus is substantially greater than that of the multi-arm sparger. In general, operation at gas feed rates which cause a reduction of $P_G/P_0$ below 0.9 is not recommended due to the inevitable flooding condition which will be encountered and the system inefficiencies associated with flooding.

With respect to curve P in FIG. 8, it is well established that the power ratio of the apparatus of the prior art disk-type submerged turbine is highly sensitive to gas load. Calderbank (Trans. Inst. Chem. Eng. (London) 36,443 (1958)) offers a correlation for the power ratio/feed gas rate relationship of sparging apparatus comprising flat disc type turbines to which the feed gas is introduced. Curve P in FIG. 8 shows a plot of the performance which is predicted by the Calderbank correlation for flat disc turbine spargers operating in the studied gas feed rate range. Because of the wide variation of power ratio, e.g., approximately 47% over the range of 0 to 150 SCFM, the cost of the power train for such prior art apparatus is significantly greater than for systems constructed in accordance with the instant invention.

It has also been found that the apparatus of the present invention is capable of providing high liquid flow velocities at the bottom of the tanks in which it is operated. In a further test, a sparging apparatus according to the invention of the type shown in FIG. 1 herein, was evaluated against a prior art multi-arm sparger, similar to that described above in connection with curve N of FIG. 8. The instant apparatus comprised a conical bell with 45° apex and base angles of the jet flow surface portion. The diameter of the bell, as measured at the bottom of the jet flow surface portion of the bell wall, was 6 feet. The blades of the axial flow downwardly pumping impeller had a pitch of 32° and the diameter of the impeller was 6 feet. The jet flow surface position of the bell wall had a vertical projected height H of 3.0 feet and the vertical distance between the bottom of the bell and the floor of the tank was 3.0 feet. The prior art system comprised a sparger featuring eight radially extending apertured gas sparging arms spaced around the periphery of the rotating shaft. This shaft had a passageway therein communicating with the sparging arms for introduction of aeration gas into the arms and subsequent discharge through the apertures therein. The diameter of the sparging arms was 6.0 feet, as measured by the circle scribed by the outer ends of the gas sparging arms during rotation. An axial flow, downwardly pumping impeller, was mounted above the sparger arms assembly and also had a diameter of 6.0 feet. This impeller compressed four pitched planar turbine blades disposed at a pitched angle of 32° as measured relative to the horizontal plane containing the bottom edges of the impeller blades, with a W/D ratio of 1/6, where W is the projected blade width in a plane parallel to both the longitudinal centerline of the blade and the vertical axis of the shaft and D is the diameter of the impeller. Both of these sparging apparatus were mounted in a 30 ft. by 30 ft. square tank containing 15 feet of tap water in the separate tests.

Figure 9:
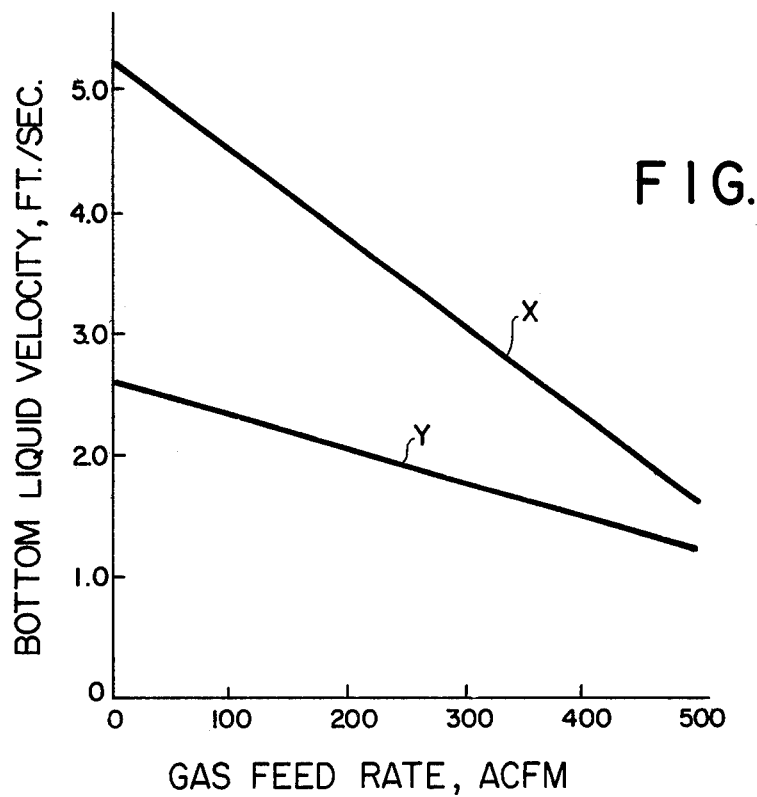
FIG. 9 is a graph showing curves for liquid velocity at the floor of a basin containing a prior art submerged turbin sparger and a sparging apparatus constructed in accordance with the present invention, respectively, plotted as a function of the gas flow rate to the sparger.

In this test, the respective sparging systems were rotated in 66 rpm and radial liquid velocity of the tap water was measured 12 inches off the bottom of the tank and 11 feet from the central vertical axis of the rotatable sparger. The results of this test are plotted in FIG. 9 and show that the liquid bottom velocities attained with the apparatus of this invention are substantially higher (for example, by at least 70% at 300 SCFM) than obtained with the prior art multi-arm sparger over the full gas feed rate of from 0 to 600 SCFM.

As shown by the foregoing, the energy expended to operate the apparatus of the present invention is employed in an especially efficient manner, first to create a high localized velocity jet flow stream with which high shearing stresses are associated, and into which gas is introduced, and second to radially outwardly direct the gas-contacted jet stream for efficient bulk mixing. The high liquid bottom velocities achieved in the practice of the instant invention are particularly important in the gas liquid contacting of liquids containing suspended solids, such as in the aeration of activated sludge mixed liquors, as in the treatment of BOD-containing wastewater, wherein the deposition of sludge suspended solids may have serious adverse effect on the efficiency of the process. In such wastewater treatment applications, the high STE values characteristic of the invention permit high dissolved oxygen levels to be achieved in the mixed liquor with resultant reduced retention times of mixed liquor in the aeration basin and reduced power expenditures for the overall system.

Although preferred embodiments of this invention have been described in detail, it will be appreciated that other embodiments are contemplated only with modification of the disclosed features, as being within the scope of the invention.

What is claimed is:

1. Apparatus for sparging gas into liquid comprising:
   a. A vertically oriented rotatable shaft;
   b. A hollow rotatable bell having a generally downwardly diverging symmetrical shape about a central vertical axis, connected to the lower end of the shaft for rotation therewith, with the outer wall surface of the bell including a circumferentially extending jet flow surface portion, with a plurality of circumferentially distributed gas flow wall openings in the base part of the jet flow surface wall portion, and an imperforate wall surface sealing segment joined to the base part of the jet flow surface wall portion to form a liquid seal for the gas flow wall openings, the jet flow surface portion of the wall being imperforate along its upper part and having a surface profile of continuous positive curvature from the base part thereof containing said gas flow wall openings to the upper part thereof with a base angle $\beta$ of between about 0° and about 60° and an apex angle $\alpha$ of between about 0° and about 65° wherein $\beta$ is the angle formed in a radial plane between a tangent to the base part surface portion and a horizontal radius line extending from the bell axis to the point of tangency and $\alpha$ is the angle formed in a radial plane between a tangent to the upper part surface portion and the bell axis;
   c. Axial flow pumping means disposed about the rotatable bell aligned for flowing liquid downwardly over the jet flow surface portion of the bell wall from the upper part to the base part thereof, to provide a high shear jet flow of liquid over the gas flow wall openings; and
   d. Means for introducing pressurized gas into the interior of the rotatable bell for discharge therefrom through the gas flow wall openings into the high shear jet flow of liquid, to provide a localized dispersion of the discharged gas in the jet flow liquid for gas-liquid contacting and bulk mixing thereof.

2. Apparatus according to claim 1 wherein the axial flow pumping means comprise an impeller fixedly attached to the rotatable shaft with outwardly extending blades intermediate the upper end and the lower end of the rotatable shaft.

3. Apparatus according to claim 2 wherein the liquid flow area within the diameter scribed by the impeller blade tips is between 0.25 and 2.25 times the cross-sectional area of the rotatable bell in a horizontal plane at the base part of the jet flow surface portion of the bell wall.

4. Apparatus according to claim 2 wherein the blades are planar and pitched at an angle of from 10° to 45° relative to the horizontal plane containing the bottom edges of the impeller blades, with the ratio W/D for the impeller being in the range of from about 0.11 to 0.25 wherein W is the projected blade width in a plane parallel to both the longitudinal centerline of the blade and the vertical axis of the shaft and D is the diameter of the impeller.

5. Apparatus according to claim 2 wherein the impeller is a marine propeller having a pitch to diameter ratio of from about 1.0 to 2.0.

6. Apparatus according to claim 1 wherein the rotatable bell is conically shaped.

7. Apparatus according to claim 1 wherein the jet flow surface portion of the bell wall has a hyperbolic surface profile.

8. Apparatus according to claim 1 wherein the jet flow surface portion of the bell wall has a linear surface profile.

9. Apparatus according to claim 1 wherein the base part of the jet flow surface portion of the bell wall comprises a circumferentially extending wall section of porous sintered metal having pores of at least 50 microns in diameter as the gas flow openings for the jet flow surface portion.

10. Apparatus according to claim 1 wherein the wall surface sealing segment comprises a cylindrical wall member depending vertically downwardly from the base part of the jet flow surface portion around the circumference thereof.

11. Apparatus according to claim 1 wherein the wall surface sealing segment comprises a generally horizontally disposed plate closure member joined at its periphery to the base part of the jet flow surface portion to form an enclosed interior volume in the rotatable bell and wherein the means for introducing pressurized gas into the interior of the rotatable bell comprise a passageway in the rotatable shaft communicating at its lower end with the interior volume of the bell and joined at its upper end with pressurized gas supply means.

12. Apparatus according to claim 1 wherein the bottom of the rotatable bell is open and the means for introducing pressurized gas into the interior of the rotatable bell comprise a gas flow conduit joined at one end to pressurized gas supply means, with its other end disposed proximate the open end of the rotatable bell for emitting gas into the interior thereof.

13. Apparatus according to claim 1 wherein the aspect ratio H/R of the jet flow surface portion of the bell wall is in the range of 0.5 to 2.0 wherein H is the projected vertical height of the jet flow surface portion and R is the radius of the jet flow surface portion at the bottom of the base part thereof.

14. Apparatus for sparging gas into liquid comprising:
   a. A vertically oriented rotatable shaft;
   b. A hollow rotatable bell having a generally downwardly diverging symmetrical conical shape about a central vertical axis, connected to the lower end of the shaft for rotation therewith, with the outer wall surface of the bell including a circumferentially extending jet flow surface portion, with a plurality of circumferentially distributed gas flow wall openings in the base part of the jet flow surface wall portion, and an imperforate wall surface sealing segment comprising a cylindrical wall member depending vertically downwardly from the base part of the jet flow surface wall portion and open at the bottom to form a liquid seal for the gas flow wall openings, the jet flow surface portion of the wall having a linear surface profile from the base part thereof containing said gas flow wall openings to the upper part thereof with a base angle $\beta$ of between about 30° and about 60° and an apex angle $\alpha$ of between about 30° and about 60° wherein $\beta$ is the angle formed in a radial plane between a tangent to the base part surface portion and a horizontal radius line extending from the bell axis to the point of tangency and $\alpha$ is the angle formed in a radial plane between a tangent to the upper part surface portion and the bell axis;

c. An axial flow pumping impeller disposed above the rotatable bell aligned for flowing liquid downwardly over the jet flow surface portion of the bell wall from the upper part to the base part thereof, to provide a high shear jet flow of liquid over the gas flow wall openings; and d. Means for introducing pressurized gas into the interior of the rotatable bell comprising a gas flow conduit joined at one end to pressurized gas supply means, with its other end disposed proximate the open bottom of the rotatable bell for emitting gas into the interior thereof, for discharge therefrom through the gas flow wall openings into the high shear jet flow of liquid, to provide a localized dispersion of the discharged gas in the jet flow liquid for gas-liquid contacting and bulk mixing thereof.

* * * * *